Aug. 7, 1956 A. N. IKNAYAN 2,758,081
VALVE STEM
Filed Feb. 15, 1954

INVENTOR.
ALFRED N. IKNAYAN
BY
Henry P. Truesdell
ATTORNEY

United States Patent Office 2,758,081
Patented Aug. 7, 1956

2,758,081

VALVE STEM

Alfred N. Iknayan, Grosse Pointe Farms, Mich., assignor to United States Rubber Company, New York, N. Y., a corporation of New Jersey Application February 15, 1954, Serial No. 410,105

14 Claims. (Cl. 204—197)

This invention relates to adhesion of rubber to metal, and in particular it relates to a bond between rubber and a metal insert as used in valves for pneumatic tires. More particularly, the invention relates to means for preventing the deterioration of adhesion between the rubber and metal portions of a valve stem in an inner tube.

This application is a continuation-in-part of my copending application, Serial No. 100,315, filed June 21, 1949, now abandoned, and assigned to the same assignee as the instant application.

Valve stems as used for pneumatic tires consist generally of a brass sleeve or insert having its major stem portion covered with a rubber composition or a synthetic rubber composition in the form of a protective sleeve. It is essential that a good bond between the materials result in order to prevent leakage from the inner tube. A particularly good bonding relationship is obtained between brass and rubber. Consequently, brass is used as the metal element or insert for valve stems. Under ordinary conditions, the adhesion obtained between the brass and the rubber will function effectively to seal the air of the inner tube throughout the normal life of the valve stem or inner tube. However, in certain cases, such as in farm tires, water, or calcium chloride solution, or other salt solutions, are used inside of the inner tube for increasing the weight of the tire. The presence of a salt solution associated with valve stems results in deterioration of the bond between the rubber and the metal.

In order to overcome this condition, I have found that the presence of a different metal associated with the brass is capable of completely and effectively preventing deterioration of the bond between the rubber and the brass. The type of metal used for association with the brass should be higher in the electromotive series than that of the brass i. e., more anodic than brass. Examples of such metals are magnesium, aluminum, cadmium, zinc, tin, lead, iron and steel.

In carrying out my invention, I apply a ring or member of a metal more anodic than the brass insert in association with the brass insert of the valve stem. In one form of the invention, this ring or member is located at that end of the valve stem which is adjacent to the interior of the inner tube. It is usually at this point where the bond between the rubber and the metal begins to fail, and consequently the presence of the metal more anodic than brass at this critical region is more effective in preventing such failure of the bond.

As further protection against deterioration of the bond between the brass insert and rubber sleeve I may place the ring around a thin layer of rubber bonded to the exposed inner end of the insert, the arrangement being such that the rubber is placed in compression so that it functions as a mechanical seal. In this way the mechanical and chemical properties of the ring act in combination to maintain a good bond.

It is among the objects and advantages of my invention to prevent deterioration of the bonding relationship between rubber and metal; to provide an inner tube and valve stem combination which will function effectively in the presence of salt solutions.

These and other objects and advantages will appear more fully in the following detailed description when considered in connection with the accompanying drawing, in which.

Figure 1:
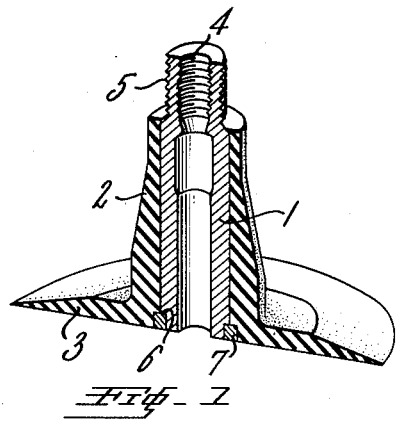
Fig. 1 is a perspective view, in section, of a valve stem for inner tubes constructed in accordance with my invention.

With reference to Fig. 1 of the drawing, I show an embodiment of my invention in the form of a valve stem for inner tubes. In accordance with conventional practice, valve stems usually consist of a brass sleeve or insert 1 and an outer covering of rubber composition to form the stem portion 2, and the base portion 3. In use, the stem 2 is inserted through an opening in the wall of the inner tube and the base portion cemented and vulcanized to the wall of the tube. The insert 1 includes, at one end, internal threads 4 for the reception of a valve mechanism and external threads 5 to which a dust cap may be fitted. It is customary practice to bond the rubber composition 2 to the metal sleeve 1. This bonding relationship forms the major means of attachment of the rubber to the metal part. When reference is made to rubber compositions, it is to be understood that it includes the various synthetic rubber compositions as well as natural rubber.

The sleeve or insert 1 is formed of brass because of its ability to withstand corrosion and because of the ability of the brass surface to form a strong bond with rubber. It is to be understood that other metals may be used, but that, in such instances, it is desirable that the metal be brass plated for purposes of adhesion. At the lower portion of the insert 1 is a shoulder 6, and a collar 7 of a metal more anodic than the brass is pressed onto the end of insert 1 so as to be flush therewith. The size of the collar is not critical, but for purposes of processing it is desirable to form the collar 7 so that the dimension of its wall will be approximately $\frac{1}{16}$ inch square. Among those metals of which the collar 7 may be formed are, magnesium, aluminum, cadmium, zinc, tin, lead, iron and steel. Aluminum, cold rolled S. A. E. 1019 steel and tool steel containing 0.50% carbon, 0.40% manganese, 1.00% silicon, and 0.50% molybdenum have been found to be particularly satisfactory for protecting the bond between the brass insert and the rubber composition. In the present insert, a preferred composition of the brass is 63% copper and 37% zinc. However, good results can be obtained where the copper is in a range of between 62% and 80%.

Certain metals higher than brass in the electromotive series, i. e., more anodic than brass, for example, certain of the alkali metals such as lithium, sodium and potassium, and certain of the alkaline earth metals such as calcium and barium are unsuitable for use on the valve insert because they react rapidly with water. Therefore, in choosing for the collar a metal in the electromotive series more anodic than the metal of the valve insert, the metal chosen must be one which is practical for the purposes indicated.

Figure 2:
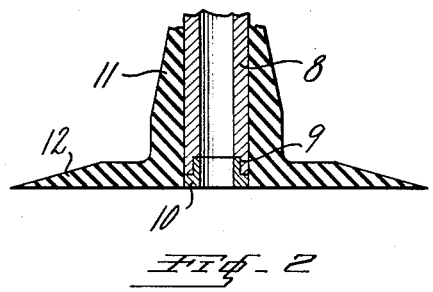
Figs. 2, 3 and 4 are sectional views of portions of a valve stem illustrating modified forms of the invention.

Fig. 2 illustrates a modification of the invention and demonstrates that the collar 7 may assume various shapes in its attachment to the brass insert. For example, a metal insert 8 may include a bore 9 at its lowermost end and a collar 10 of a metal more anodic than the brass may be pressed into the bore 9. In such case, the collar 10 may be formed so as to be flush both internally and externally of the insert 8. Similarly to that disclosed in Fig. 1, a rubber composition 11 is vulcanized in bonded relationship to the outer peripheral surface of the insert 8 and the rubber composition is flanged outwardly to form a base portion 12.

Figure 3:
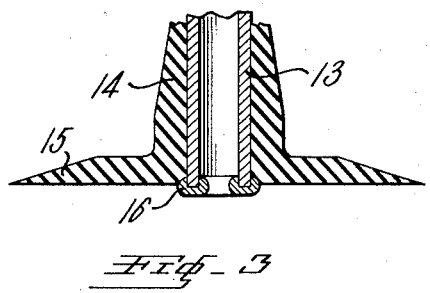

Another modification is illustrated in Fig. 3 which utilizes a metal insert 13 with rubber 14 bonded thereto having a flange portion 15. The bottom edge of the insert 13 is treated by dipping the insert into a molten metal more anodic than the brass so as to form an annular deposit of the metal 16 at the lower end of the insert 13. It is to be understood that this deposit may also be formed by spraying metal onto the end portion of the insert 13 or by electroplating metal thereon. This operation will ordinarily take place before the rubber composition is bonded to the metal insert. However, it is possible to apply the metal to the exposed end of the insert 13 even after it is assembled with the rubber composition.

Figure 4:
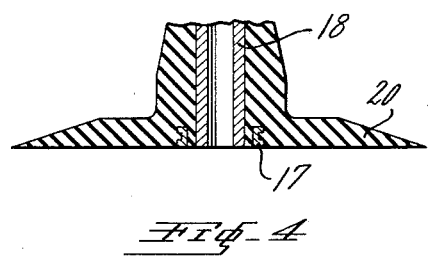

Still another modification of my invention is shown by Fig. 4. In this form, the more anodic metal is in the form of a ring 17 which is spaced slightly from the valve stem 18. A groove in the ring anchors it to the rubber sleeve 20 of the valve. The construction is such that a small portion of the rubber separates the two metal parts. This slows down the rate at which the more anodic metal ring is corroded or sacrificed. At the same time, the bond between the rubber sleeve 20 and the brass sleeve 18 is protected adequately.

In the manufacture of the valve stems of Figs. 1, 2 and 3, the rings or collars may be attached to the inserts prior to the application of the rubber thereto. If desirable, the more anodic metal part may be attached to the brass insert after the rubber is vulcanized in bonded relationship with the insert. In such case, however, a cavity or opening is formed in the rubber composition for the reception of the subsequently applied more anodic metal member.

Figure 5:
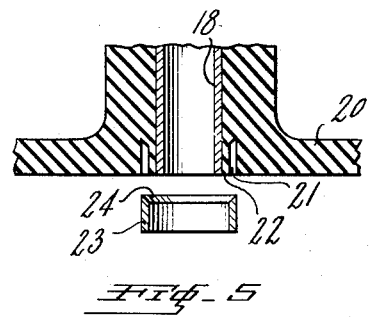
Figs. 5, 6 and 7 illustrate further modifications of the invention in which part of the rubber of the valve construction is placed under compression.
Figure 6:
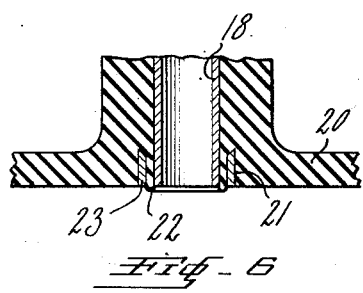

Fig. 5 illustrates the manner of assembling a further modification of the invention shown by Fig. 6. This modification is somewhat similar to that shown by Fig. 4 in that a separate metal collar is set into the rubber composition surrounding the valve insert but differs therefrom in placing the layer of rubber between the collar and valve stem under compression. To this end, the rubber composition at the inner end of the valve insert is formed with a circular well or depression 21. This circular well is slightly spaced from the insert 18 so as to leave a thin layer of rubber 22 interposed between the insert 18 and the well 21. This thin layer of rubber 22 as well as the entire sleeve is bonded throughout its length to the metal insert 18. A metal ring or collar 23 having an inner diameter slightly less than the outer diameter of the layer of rubber 22 is forced into the well 21 so as to place the rubber layer in a state of compression. This assembled relationship is shown, in particular, in Fig. 6. In order to facilitate the application of the ring 23 to the rubber layer 22, a beveled portion 24 is formed on the leading edge of the ring. The compression of the rubber is sufficient to hold the ring in place, and the fact that the rubber layer 22 is under compression functions as an additional means for preventing separation of the bond between the rubber layer 22 and the outer surface of the metal insert 18. It has been demonstrated that bond deterioration can be substantially reduced when the rubber is under compression. As far as compressing the rubber is concerned the ring 23 may be formed of any metal having sufficient structural characteristics so as to mechanically confine and compress the rubber layer 22. However, as already indicated, I prefer to utilize a metal such as aluminum, magnesium, cadmium, zinc, tin, lead, iron and steel to take advantage of the protection of the bond between the rubber and the brass valve stem afforded by such metals.

Figure 7:
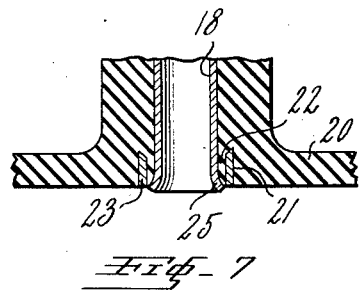

Fig. 7 illustrates a further modification of the construction of Fig. 6 except that the marginal edge 25 of the insert 18 is swaged or expanded outwardly so that the insert 18 makes contact with the ring 23. This swaging operation provides additional compression of the rubber layer 22.

In the operation of the valve stem, the stem is applied to an inner tube by means of the base members being vulcanized directly to the inner tube. This is in accordance with conventional practice. In the event that the bond between the rubber and the brass insert becomes exposed to the influence of any corroding material within the inner tube, such as water or a salt solution, the bond between the rubber and the brass insert is protected by the presence of the metal collar more anodic than the brass insert.

It is, therefore, believed apparent that I have provided an effective method of preserving the bond between rubber and metal in the presence of corroding substances and which may be accomplished effectively, efficiently, and economically. The invention is particularly useful with inner tube valve stems.

While I have shown a preferred embodiment of my invention, it is to be understood that it is susceptible of obvious modifications and as appearing in the scope of the appended claims.

Having thus described my invention, what I claim and desire to protect by Letters Patent is:

1. A rubber-to-metal bonded article, the bond being effective in the presence of metal corroding liquids comprising a metal base having a brass surface, a rubber composition vulcanized in bonded relationship with said brass surface, a metal member carried by said article and having an exposed surface, said metal member being more anodic than said brass surface whereby the presence of said metal member protects the bond between the rubber composition and the brass surface of said metal base.

2. A valve stem effective in the presence of metal corroding liquids comprising a tubular metal insert having a brass outer surface, a rubber composition vulcanized in bonded relationship to the brass outer surface of said insert, an exposed metal member carried by the valve stem, said metal member being more anodic than the brass outer surface of said metal insert whereby the metal member protects the bond between the rubber composition and the brass outer surface of said metal insert.

3. A valve stem effective in the presence of metal corroding liquids comprising a tubular brass insert, a rubber composition vulcanized in bonded relationship around and to said insert, and an exposed aluminum member carried by said valve stem whereby the aluminum member protects the bond between the rubber composition and the brass insert.

4. A valve stem for use in inflatable inner tubes the interior of which may contain metal corroding liquids comprising, in combination, a tubular brass insert having an outer valve end portion and an inner end portion, a rubber composition vulcanized in bonded relationship around and to said brass metal insert, and an exposed metal annulus in the rubber composition adjacent the inner end of the insert and being separated therefrom by a layer of the rubber composition, said annulus being more anodic than the brass insert whereby the presence of the annulus protects the bond between the rubber composition and the brass insert.

5. A valve stem for use in inflatable inner tubes the interior of which may contain metal corroding liquids comprising, a tubular brass insert having an outer valve portion and an inner end portion, a rubber composition vulcanized in bonded relationship around and to the brass insert, an exposed aluminum annulus set in the rubber composition surrounding the inner end of the insert and being separated therefrom by a layer of the composition whereby said aluminum annulus protects the bond between the rubber composition and the brass insert.

6. A valve stem for use in inner tubes the interior of which may contain metal corroding liquids comprising, a tubular brass insert having an outer valve end portion and an inner end portion, a rubber composition vulcanized in bonded relationship around and to the metal brass insert, and an exposed metal member carried by the inner end portion of the insert, said metal member being more anodic than the brass insert whereby the metal member protects the bond between the rubber composition and the brass insert.

7. A valve stem for use in an inner tube the interior of which may contain metal corroding liquids comprising, a tubular brass insert having an outer valve end portion and an inner end portion, a rubber composition vulcanized in bonded relationship around and to the brass insert, and an exposed aluminum member supported by the inner end portion of the insert whereby the presence of the aluminum member protects the bond between the rubber composition and the brass insert.

8. A valve stem for use in inner tubes the interior of which may contain metal corroding liquids comprising, a tubular brass insert having an outer valve end portion and an inner end portion, a rubber composition vulcanized in bonded relationship around and to the brass insert, and an exposed annular metal member positioned in spaced concentric relationship with the inner end portion of the insert with a thin layer of the rubber composition interposed between said member and said insert, said member being more anodic than the brass insert whereby said metal member protects the bond between the rubber composition and the brass insert in the presence of said metal corroding liquids.

9. A valve stem for use in inner tubes the interior of which may contain metal corroding liquids comprising, a tubular brass insert having an outer valve end portion and an inner end portion, a rubber composition vulcanized in bonded relationship around and to the brass insert, and an exposed aluminum annulus positioned in spaced concentric relationship with the inner end portion of the insert with a thin layer of the rubber composition interposed between said annulus and said insert so that said aluminum annulus protects the bond between the rubber composition and the insert in the presence of corrosive liquids, said brass insert adjacent its inner end portion being expanded toward said annulus to place said layer of rubber composition in compression.

10. A rubber-to-metal bonded article, the bond being effective in the presence of metal corroding liquids comprising, a metal base having a brass surface, a rubber composition vulcanized in bonded relationship with said brass surface, a metal member carried by said article and having an exposed surface, said metal member being selected from the group consisting of aluminum, magnesium, cadmium, zinc, tin, lead, iron and steel, whereby the presence of said metal member protects the bond between the rubber composition and the brass surface of said metal base.

11. A valve stem for use in an inner tube the interior of which may contain metal corroding liquids comprising, a tubular brass insert having an outer valve end portion and an inner end portion, a rubber composition vulcanized in bonded relationship around and to the brass insert, an exposed metal member supported by the inner end portion of the insert, said metal member being selected from the group consisting of aluminum, magnesium, cadmium, zinc, tin, lead, iron and steel, whereby the presence of the metal member protects the bond between the rubber composition and the brass insert.

12. A valve stem for use in inflatable inner tubes the interior of which may contain metal corroding liquids comprising, in combination, a tubular brass insert having an outer valve end portion and an inner end portion, a rubber composition vulcanized in bonded relationship around and to said brass metal insert, and an exposed metal annulus in the rubber composition adjacent the inner end of the insert and being separated therefrom by a layer of the rubber composition, said metal annulus being selected from the group consisting of aluminum, magnesium, zinc, cadmium, tin, lead, iron and steel, whereby the metal member protects the bond between the rubber composition and the brass insert.

13. A valve stem for use in an inner tube the interior of which may contain metal corroding liquids comprising, a tubular brass insert having an outer valve end portion and an inner end portion, a rubber composition vulcanized in bonded relationship around and to the brass insert, and an exposed steel member supported by the inner end portion of the insert whereby the presence of the steel member protects the bond between the rubber composition and the brass insert.

14. A valve stem for use in inflatable inner tubes the interior of which may contain metal corroding liquids comprising, in combination, a tubular brass insert having an outer valve end portion and an inner end portion, a rubber composition vulcanized in bonded relationship around and to said brass metal insert, and an exposed steel annulus in the rubber composition adjacent the inner end of the insert and being separated therefrom by a layer of the rubber composition, whereby the presence of the steel annulus protects the bond between the rubber composition and the brass insert.

References Cited in the file of this patent

UNITED STATES PATENTS

| 2,261,833 | Kreyer | Nov. 4, 1941 |
| 2,275,820 | Hosking | Mar. 10, 1942 |

OTHER REFERENCES

"Chemical and Metallurgical Engineering," Oct. 1940, page 691.